C. RICHMOND.
Cotton-Seed Planter.
No. 77,761. Patented May 12, 1868.
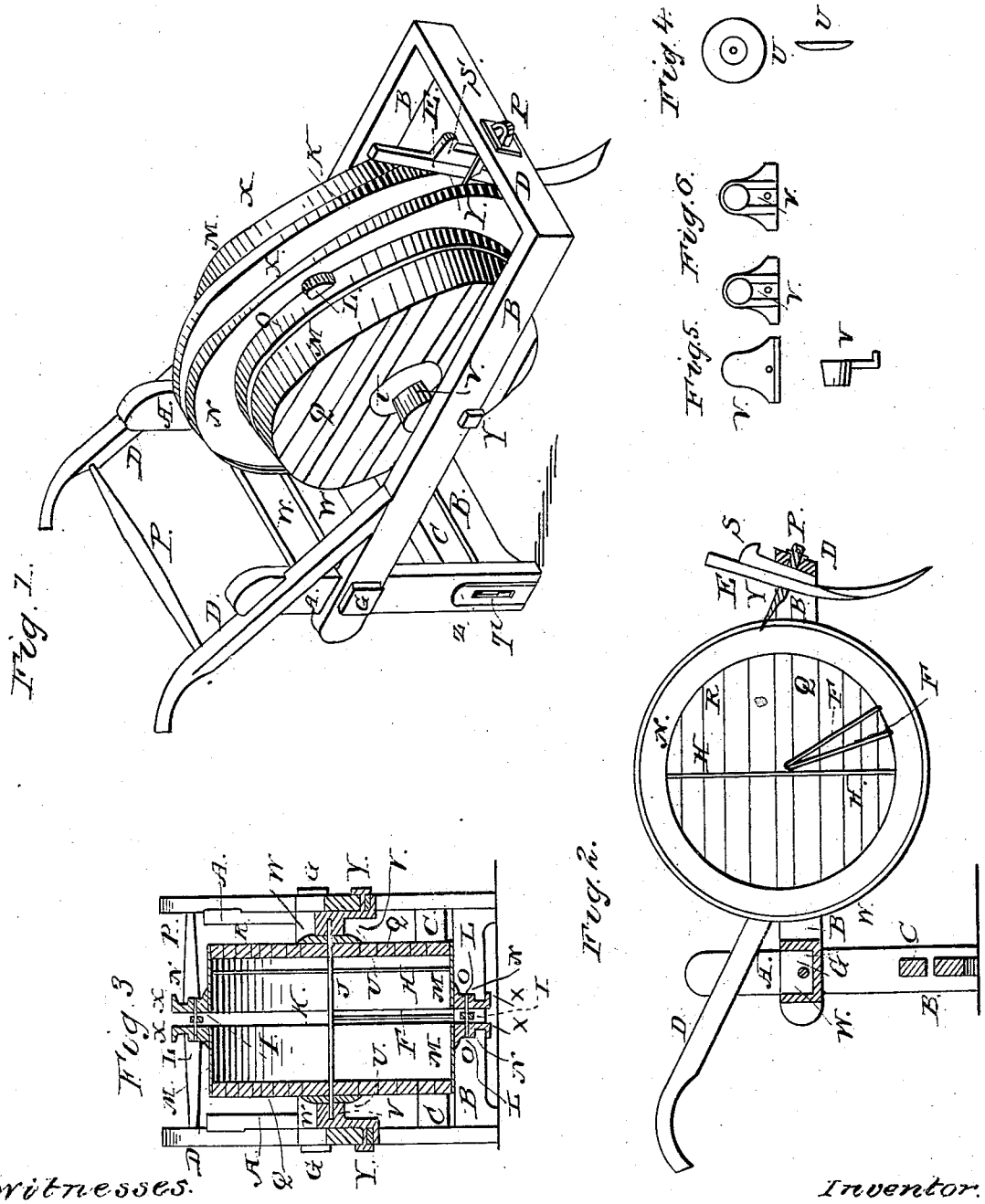

United States Patent Office.

CHARLES RICHMOND, OF MEMPHIS, TENNESSEE, ASSIGNOR TO GAYNOR, STILES, AND COMPANY, OF SAME PLACE.

Letters Patent No. 77,761, dated May 12, 1868.

IMPROVEMENT IN COTTON-PLANTERS.

*The Schedule referred to in these Letters Patent and making part of the same.*

TO ALL WHOM IT MAY CONCERN:

Be it known that I, CHARLES RICHMOND, of the city of Memphis, in the county of Shelby, and State of Tennessee, have invented a new and useful Improvement on Cotton-Planters; and I do hereby declare that the following is a full, clear, and exact description thereof, reference being had to the accompanying drawings, and to the letters of reference marked thereon.

Figure 1 represents an isometrical elevation of the cotton-planter.

Figure 2 represents a section of the same.

Figure 3 represents a transverse section of the same.

Figure 4 represents the flange on side of drum, with hollow axis in same.

Figure 5 represents hollow journal.

Figure 6 represents plates, in which are fixed shaft of agitator.

The machine consists of a drum, revolving in the journal attached to the frame A B C D, of which A is a standard, carrying the follower or drag-block B, moving in the slots L S: D D are the arms; E is the coulter; S, key; Y P, scraper for clearing dirt between flanges of drum.

The drum is constructed as follows:

Q Q Q Q, in fig. 2, are disks of wood, on which are fastened the cylinders M M, and on which are fastened the flanges N N, and kept apart by the adjusting-bolts L. H H are transverse rods, to prevent the seed from lumping. F J are the arms of the agitator for separating the seed, and distributing at the lowest point between the flanges, and forcing it out into the furrows. R is a trap on hinges to feed the drum with seed. O X are the flanges to drum.

I make no claim in regard to the frame, drag-block, or coulter; but I claim an improvement in the construction of the drum, for the sure method of distributing the cotton-seed.

Wherein I claim improvements, is—

In the adjustable flanges, whereby they can be separated or closed at will, for the proper distribution of seed, the separators to keep the seed disunited, in order to distribute equally and regularly, together with the hollow journals, allowing the whole to revolve and adapt itself.

CHARLES RICHMOND.

Witnesses:
A. F. SCHULZE,
F. L. FISCHER.